United States Patent
Karaki et al.

(10) Patent No.: US 12,474,275 B2
(45) Date of Patent: Nov. 18, 2025

(54) INSPECTION APPARATUS AND INSPECTION METHOD

(71) Applicant: SHIN-ETSU HANDOTAI CO., LTD., Tokyo (JP)

(72) Inventors: Yoichi Karaki, Chikuma (JP); Shinnosuke Ichikawa, Chikuma (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 100 days.

(21) Appl. No.: 18/036,297

(22) PCT Filed: Oct. 6, 2021

(86) PCT No.: PCT/JP2021/036895
§ 371 (c)(1),
(2) Date: May 10, 2023

(87) PCT Pub. No.: WO2022/107470
PCT Pub. Date: May 27, 2022

(65) Prior Publication Data
US 2024/0011919 A1 Jan. 11, 2024

(30) Foreign Application Priority Data
Nov. 18, 2020 (JP) .................... 2020-191371

(51) Int. Cl.
*G01N 21/90* (2006.01)
*G01N 21/88* (2006.01)

(52) U.S. Cl.
CPC ..... *G01N 21/9018* (2013.01); *G01N 21/8806* (2013.01)

(58) Field of Classification Search
CPC ......... G01N 33/57484; G01N 33/5308; G01N 33/5023; G01N 33/6893; G01N 33/5011;
(Continued)

(56) References Cited

U.S. PATENT DOCUMENTS

2010/0074514 A1   3/2010   Hayashi et al.

FOREIGN PATENT DOCUMENTS

| CN | 110544658 A | * | 12/2019 | ............. G01N 21/88 |
| CN | 111830053 A | * | 10/2020 | ........... B07C 5/3404 |

(Continued)

OTHER PUBLICATIONS

Decision of Rejection issued in Japanese Patent Application No. 2020191371, dated Sep. 6, 2022.
(Continued)

*Primary Examiner* — Michael P Stafira
(74) *Attorney, Agent, or Firm* — Harness, Dickey & Pierce, P.L.C.

(57) ABSTRACT

The present invention is an inspection apparatus for inspecting a container including a light-transmittable transparent portion and configured to house a wafer, the apparatus including: a flat lamp provided to irradiate a portion to be inspected including at least a part of the transparent portion of the container with light; and a camera provided to face the flat lamp across the portion to be inspected of the container and configured to image the portion to be inspected so as to detect a foreign matter and/or a defect in the portion to be inspected of the container. This can provide an inspection apparatus and inspection method that can inspect whether a foreign matter or a defect is present inside a wafer container more certainly than visual inspection by a person.

15 Claims, 11 Drawing Sheets

(58) Field of Classification Search
CPC ....... G01N 2800/2871; G01N 2800/50; G01N 33/68; G01N 33/5052; G01N 33/57492; G01N 33/582; G01N 33/6845; G01N 2800/52; G01N 2800/60; G01N 33/5008; G01N 2333/70503; G01N 2500/10; G01N 33/505; G01N 33/56961; G01N 33/574; G01N 2333/4716; G01N 2800/285; G01N 33/5058; G01N 33/53; G01N 2800/26; G01N 2333/705; G01N 33/573; G01N 33/57496; G01N 33/58; G01N 33/6896; G01N 2333/47; G01N 2800/24; G01N 33/5005; G01N 33/5041; G01N 33/5044; G01N 33/57407; G01N 33/56972; G01N 33/57415; G01N 33/6887; G01N 2333/70514; G01N 2500/00; G01N 33/5091; G01N 2333/4703; G01N 2800/245; G01N 2800/324; G01N 2800/7019; G01N 33/564; G01N 33/56966; G01N 2333/4745; G01N 2333/96494; G01N 2800/12; G01N 2800/56; G01N 33/5073; G01N 33/54366; G01N 33/54393; G01N 33/57419; G01N 33/57434; G01N 33/57488; G01N 33/6803; G01N 33/6818; G01N 33/6863; G01N 33/6884; G01N 33/92; G01N 2333/165; G01N 2333/555; G01N 2333/70585; G01N 2333/912; G01N 2333/922; G01N 2474/20; G01N 33/5047; G01N 33/5088; G01N 33/56983; G01N 33/57449; G01N 33/6842; G01N 33/6872; G01N 2800/2814; G01N 2800/368; G01N 33/48; G01N 33/5032; G01N 33/5082; G01N 33/5094; G01N 33/56988; G01N 33/57411; G01N 33/57423; G01N 33/57426; G01N 33/57438; G01N 1/286; G01N 1/34; G01N 1/44; G01N 15/14; G01N 2001/2866; G01N 2001/2873; G01N 21/8806; G01N 21/8851; G01N 21/90; G01N 21/9018; G01N 21/94; G01N 2333/51; G01N 2333/665; G01N 2333/70517; G01N 2333/70592; G01N 2333/70596; G01N 2333/726; G01N 2500/04; G01N 2800/065; G01N 2800/304; G01N 2800/7028; G01N 33/4833; G01N 33/5014; G01N 33/5743; G01N 33/6878; G01N 35/00; G01N 21/9501; G01N 21/88; G01N 2021/9513; G01N 21/958; G01N 21/95; G01N 21/9505; G01N 2201/10; G01N 2021/151; G01N 2021/8887; G01N 21/8803; G01N 21/896; G01N 21/956; G01N 21/95684; G01N 2021/0106; G01N 2021/8861; G01N 2021/8893; G01N 21/01; G01N 21/84; G01N 2201/021

See application file for complete search history.

(56) References Cited

FOREIGN PATENT DOCUMENTS

| EP | 3413340 | A1 | * | 12/2018 | ......... G01N 21/8851 |
|---|---|---|---|---|---|
| JP | H0547911 | A | * | 2/1993 | |
| JP | H10308426 | A | * | 11/1998 | |
| JP | H11-340310 | A | | 12/1999 | |
| JP | 2001-215199 | A | | 8/2001 | |
| JP | 2004-266221 | A | | 9/2004 | |
| JP | 2005-091243 | A | | 4/2005 | |
| JP | 2006-156740 | A | | 6/2006 | |
| JP | 2006-286700 | A | | 10/2006 | |
| JP | 2008268236 | A | * | 11/2008 | |
| JP | 2011070729 | A | * | 4/2011 | |
| JP | 2015-008223 | A | | 1/2015 | |
| JP | 2018158308 | A | * | 10/2018 | |
| JP | 2019-517668 | A | | 6/2019 | |
| WO | WO-9409923 | A1 | * | 5/1994 | .............. B08B 9/20 |
| WO | WO-0245154 | A1 | * | 6/2002 | .............. B25J 18/04 |
| WO | WO-03002276 | A1 | * | 1/2003 | .............. B08B 3/02 |
| WO | 2008-69191 | A1 | | 6/2008 | |

OTHER PUBLICATIONS

International Preliminary Report on Patentability issued in PCT/JP2021036895, dated Jun. 1, 2023.
International Search Report (English-Japanese) of the ISA issued in PCT/JP2021/036895, mailed Dec. 28, 2021; ISA/JP.
Notification of Reasons for Refusal issued in Japanese Patent Application No. 2020191371, dated Dec. 13, 2022.
Notification of Reasons for Refusal issued in Japanese Patent Application No. 2020191371, dated Jun. 7, 2022.
Taiwanese Office Action in application No. 11013781 issued on Jun. 24, 2025.

* cited by examiner

[FIG. 1]
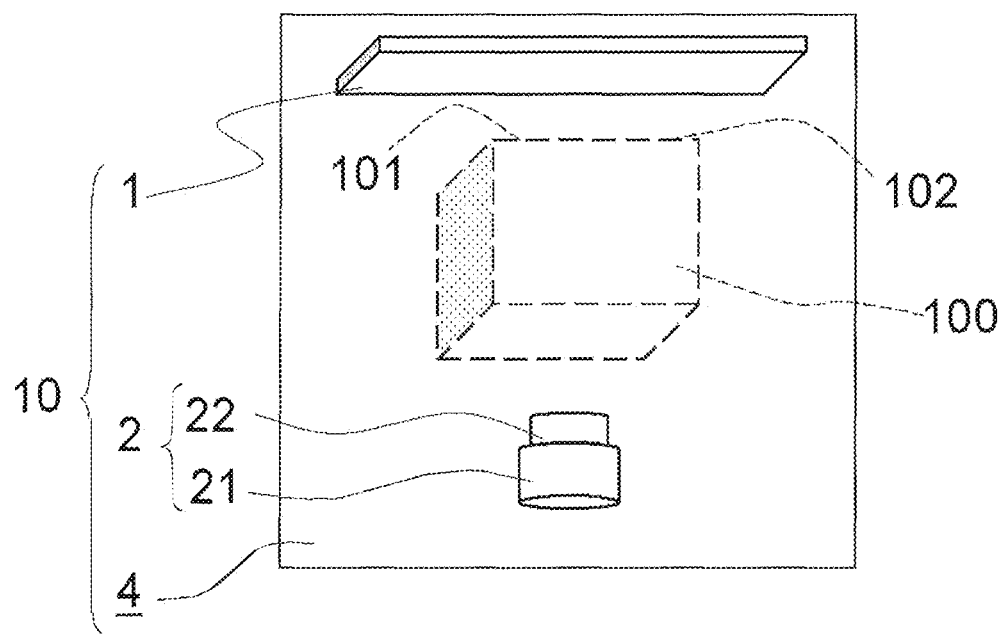

[FIG. 2]
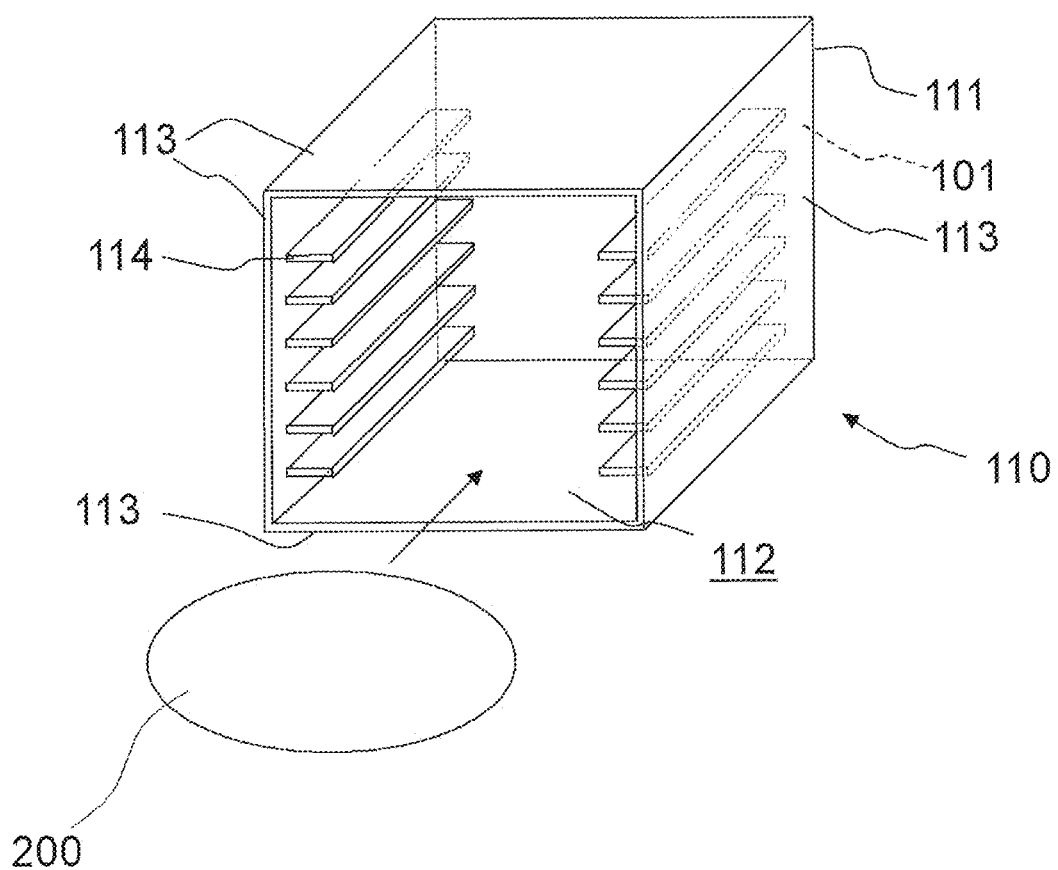

[FIG. 3]
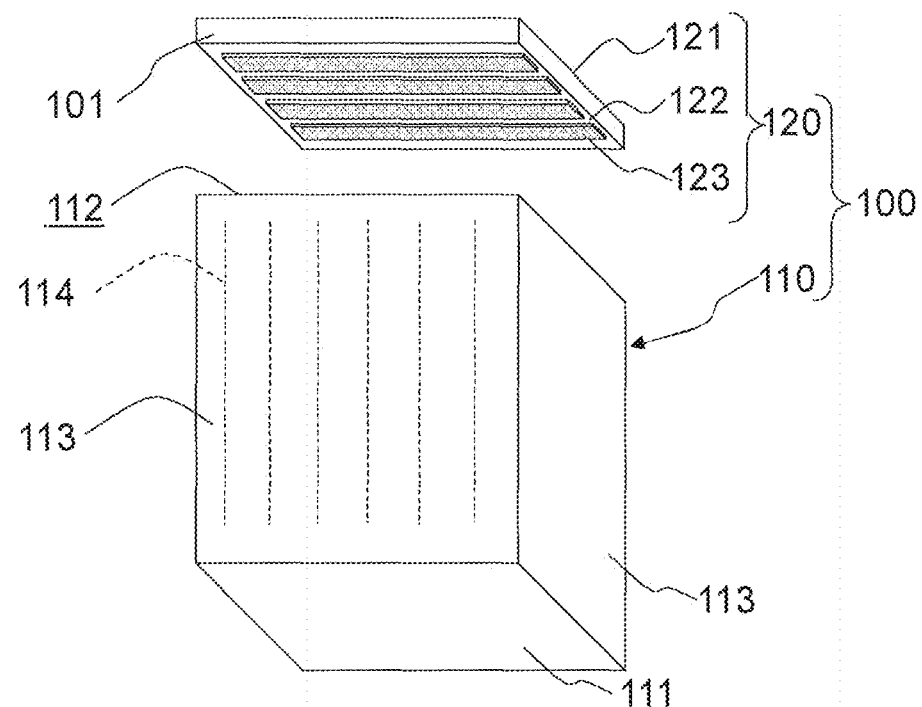
[FIG. 4]
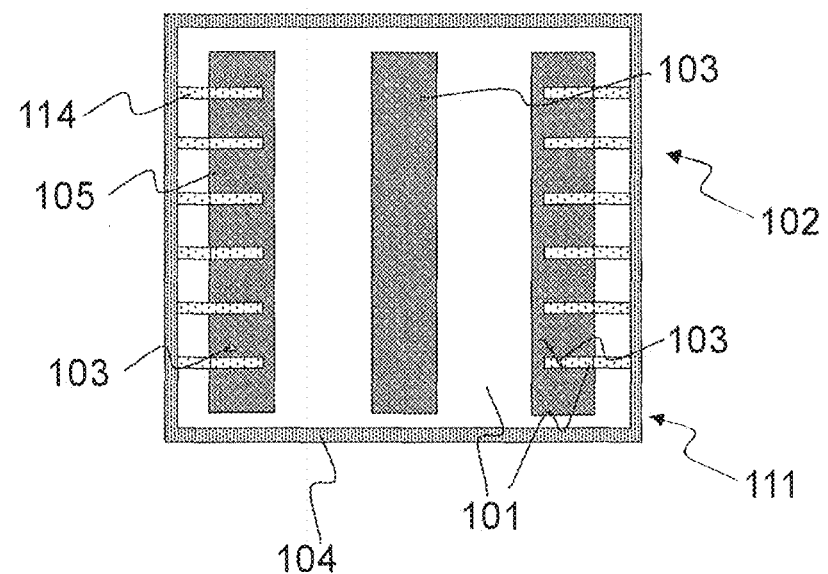

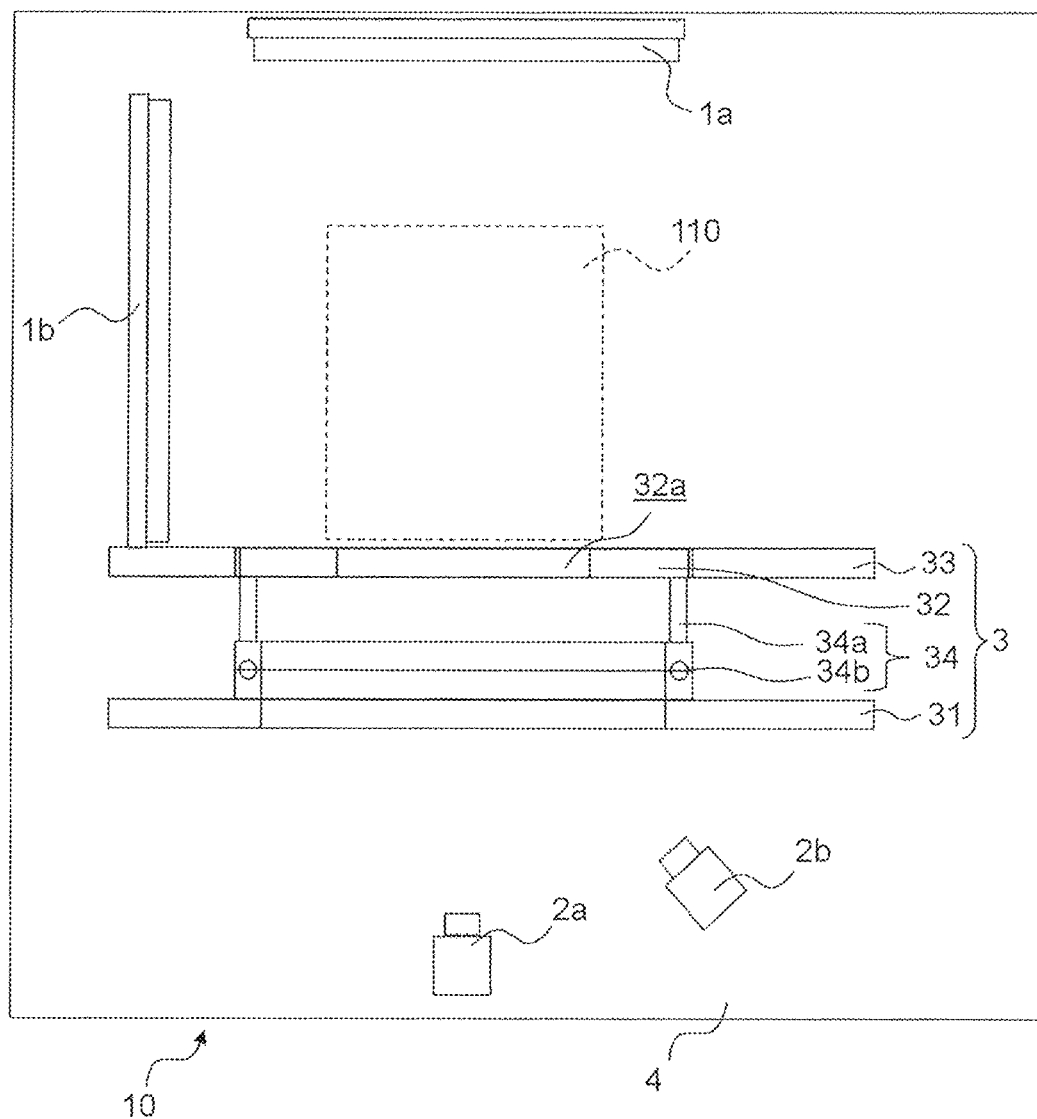
[FIG. 5]

[FIG. 6]
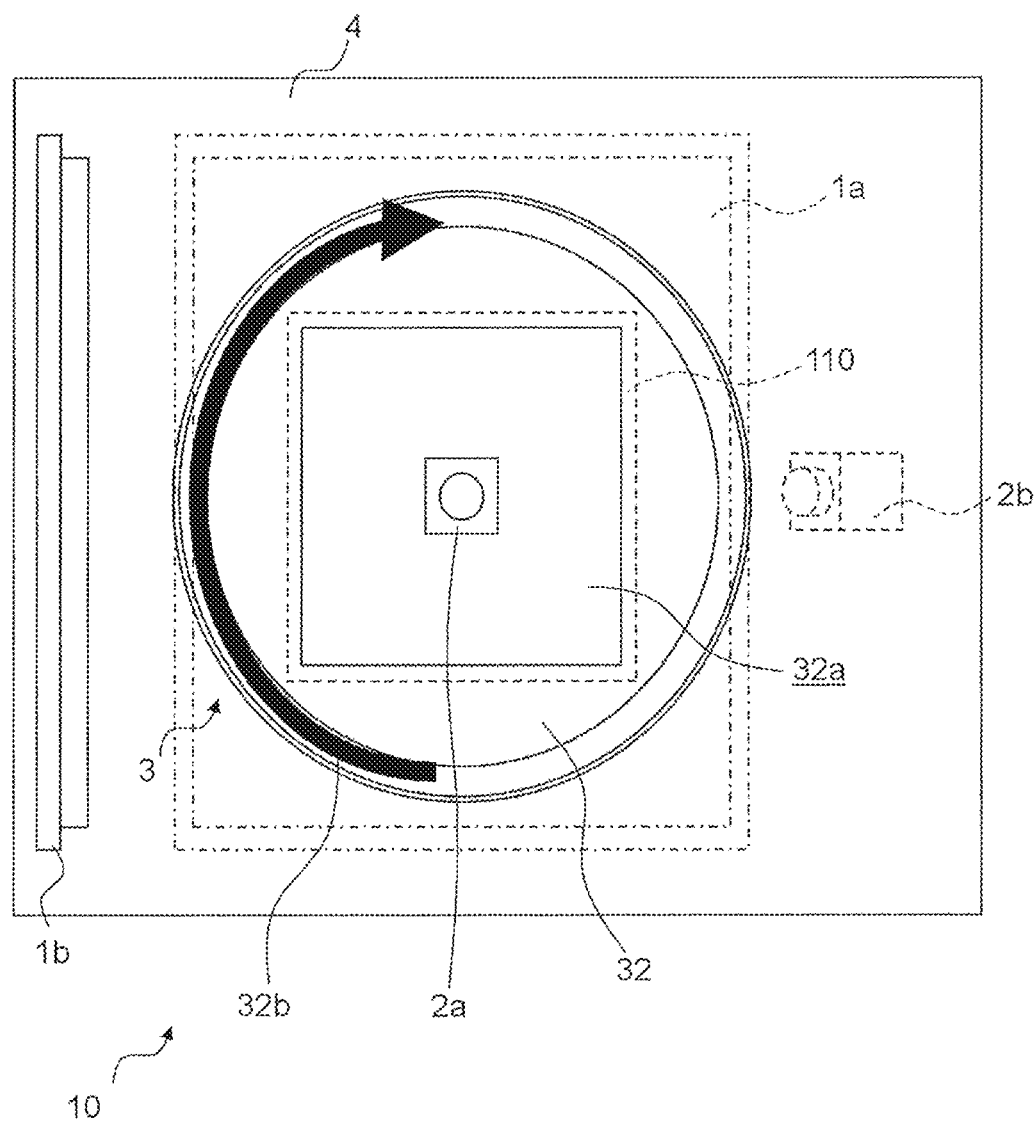

[FIG. 7]
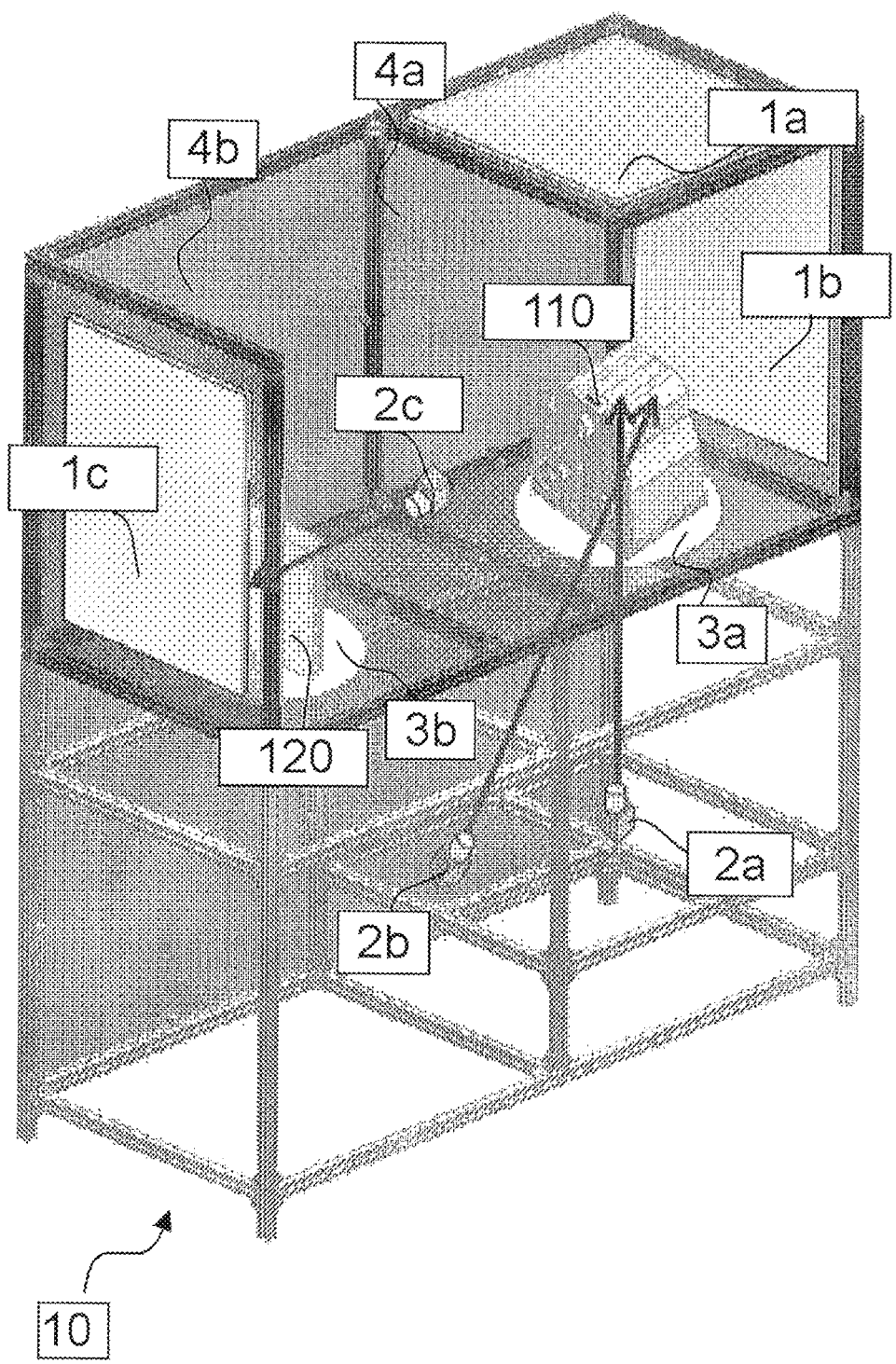

[FIG. 8]
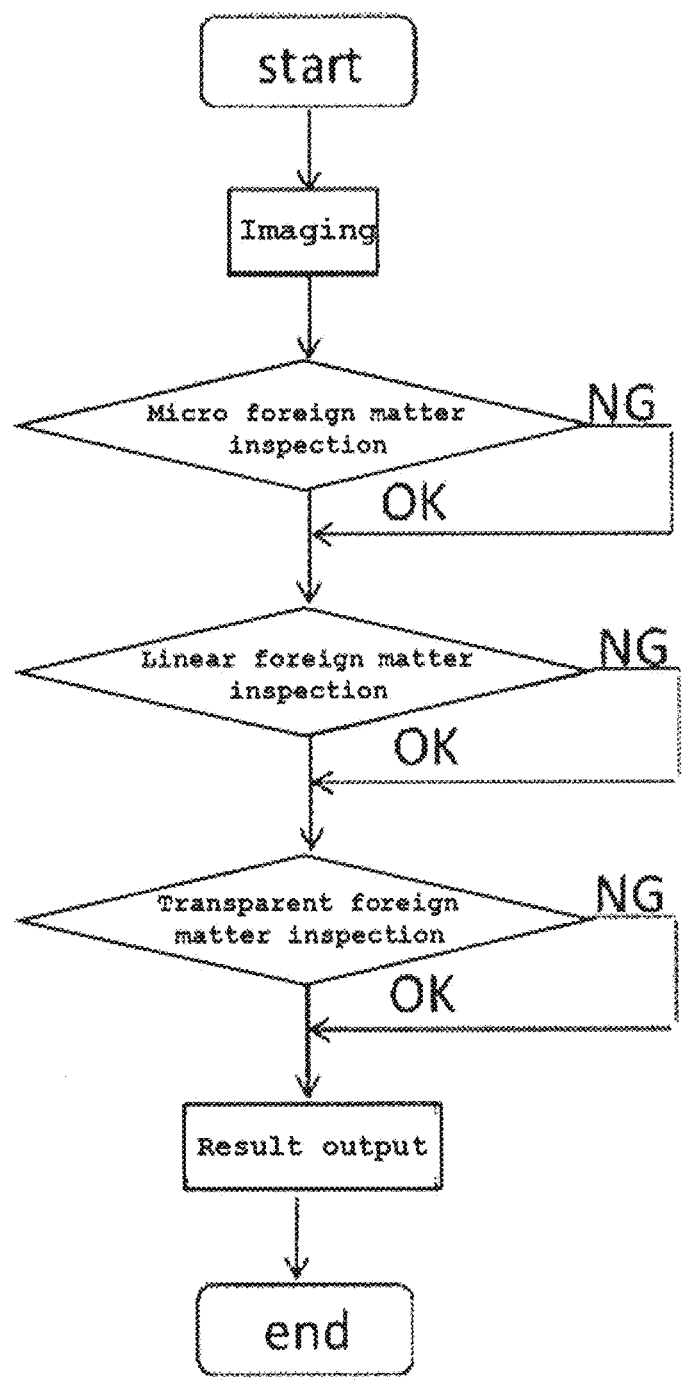

[FIG. 9]
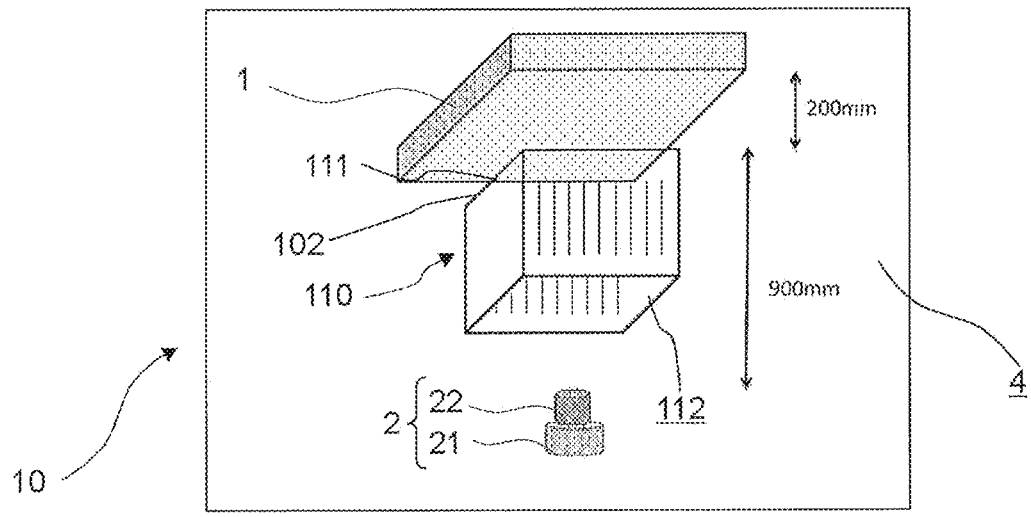
[FIG. 10]
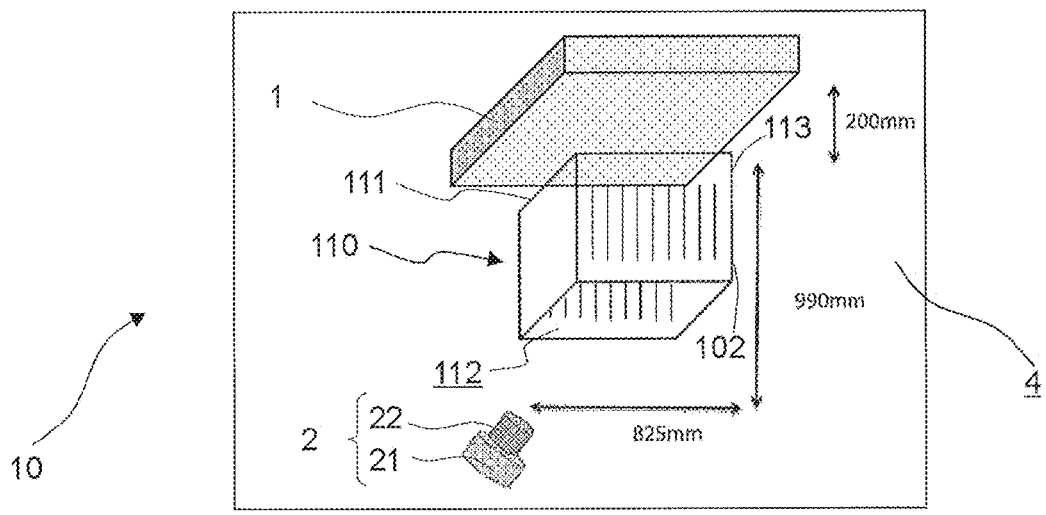

[FIG. 11]
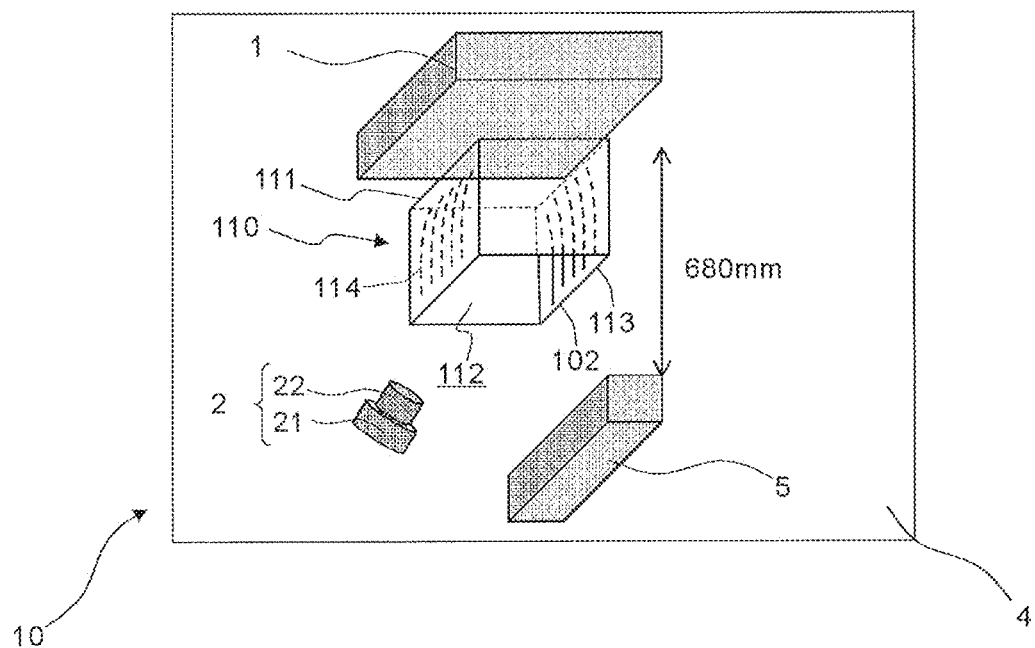

[FIG. 12]
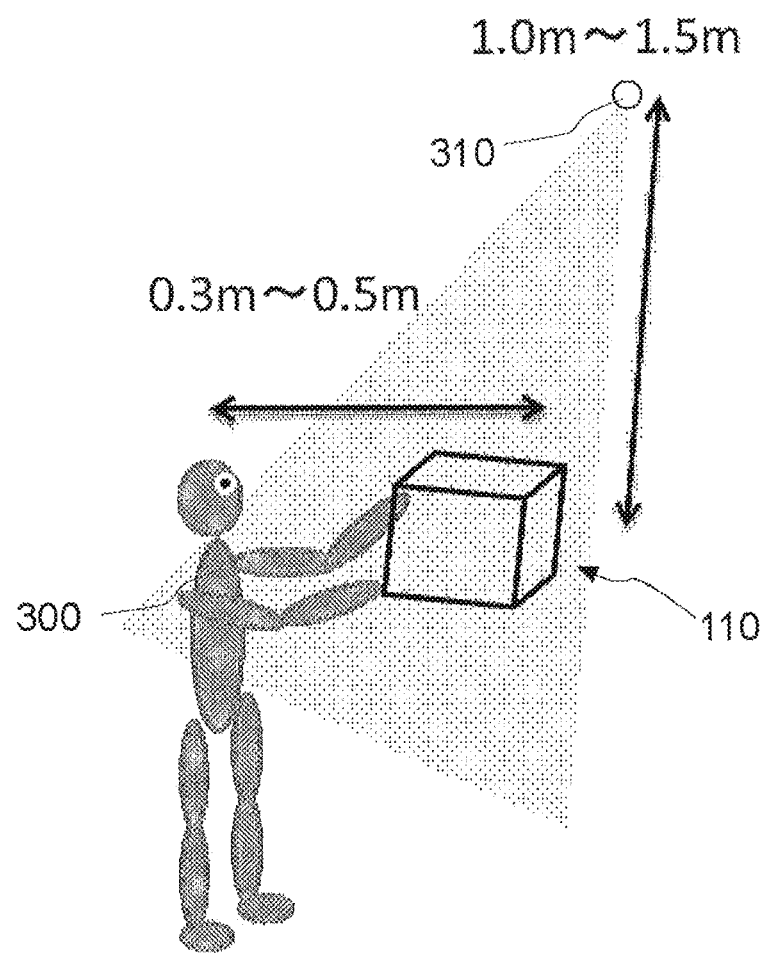

[FIG. 13]
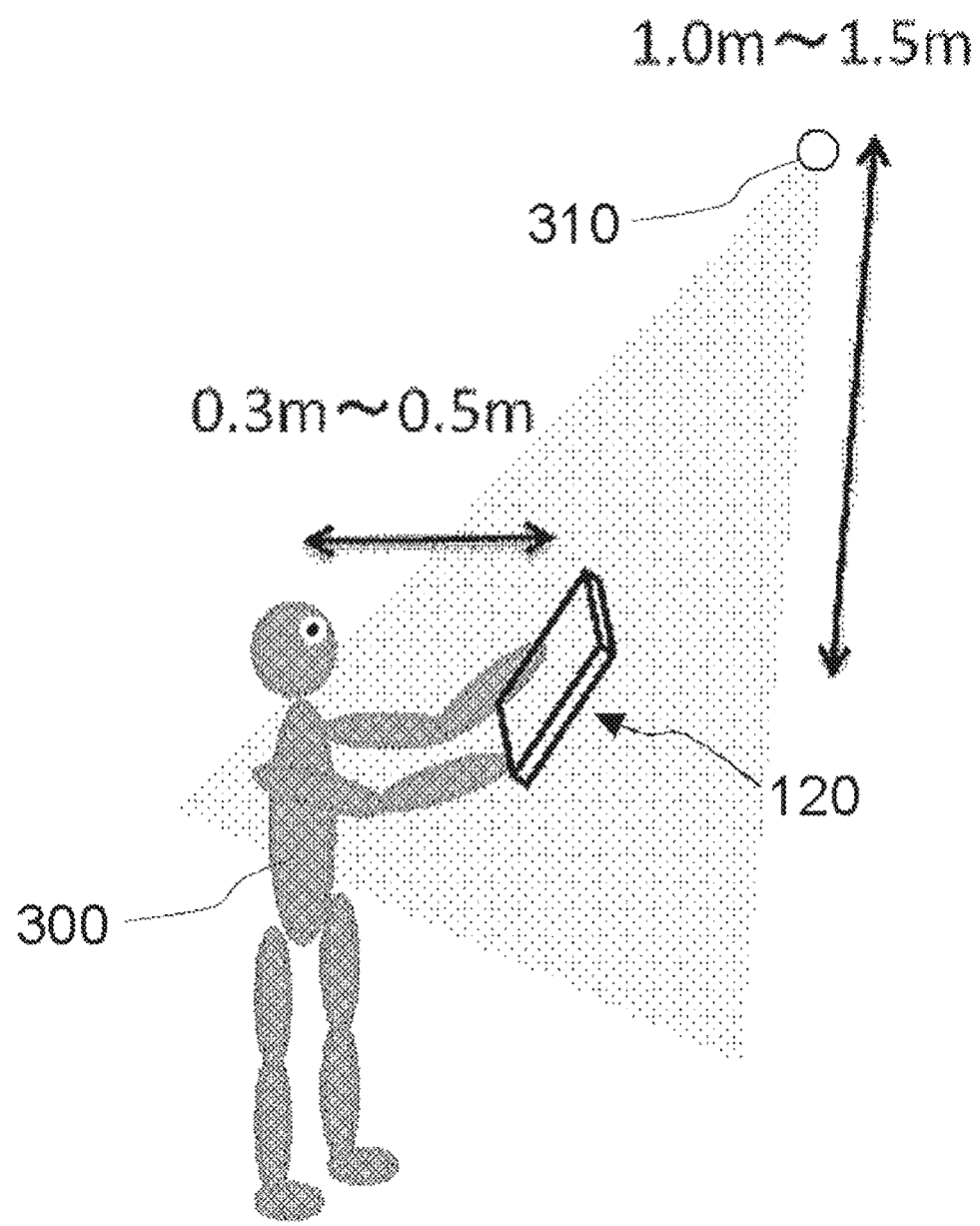

INSPECTION APPARATUS AND INSPECTION METHOD

CROSS-REFERENCE TO RELATED APPLICATIONS

This application is a 371 U.S. National Phase of International Application No. PCT/JP2021/036895, filed Oct. 6, 2021, which claims priority to Japanese Patent Application No 2020-191371, filed Nov. 18, 2020. The entire disclosures of the above applications are incorporated herein by reference.

TECHNICAL FILED

The present invention relates to an inspection apparatus configured to inspect a container configured to house a wafer and to an inspection method.

BACKGROUND ART

As semiconductor devices become more miniaturized, a silicon wafer being a base of the device is required to have higher cleanness and higher quality.

One of causes to impair the quality is a foreign matter (such as a micro foreign matter with approximately 1 mm square, a linear foreign matter such as a hair, and a transparent foreign matter such as a plastic piece) and a particle. The silicon wafer is washed and then housed in a wafer container such as a front opening shipping box (FOSB) to be shipped, and these wafer containers also have been required to have higher cleanness and higher quality as the devices become more miniaturized.

Meanwhile, from the viewpoint of cost reduction of the semiconductor devices, these wafer containers has been reused. In many cases, a wafer container used once is returned to a manufacturer of the silicon wafer, a damage, deformation, etc. are inspected, and then washed to reuse.

A new wafer container or a wafer container to be reused is washed, needed parts thereof are assembled, and as foreign matter inspection, a foreign matter adhering to an inner face of the wafer container is visually inspected by an inspection operator under an operating lamp or a fluorescent lamp. This inspection may fail to detect the adhering foreign matter depending on skill or physical condition of these inspection operators, or this inspection for a long time increases a load of the inspection operator.

Patent Documents 1 to 4 propose an apparatus for inspecting a shape of a wafer container and a number and housing state of the housed waters. However, Patent Documents 1 to 4 do not propose an apparatus for inspecting the foreign matter adhering to an inner face of the wafer container.

Patent Document 5 proposes an apparatus and method for inspecting a foreign matter inside a container for drinks. However, Patent Document 5 does not propose an apparatus nor method for inspecting the foreign matter inside the wafer container.

CITATION LIST

Patent Literature

Patent Document 1: JP 2004-266221 A
Patent Document 2: JP 2006-156740 A
Patent Document 3: WO2008/69191 A1
Patent Document 4: JP 2015-8223 A
Patent Document 5: JP 2008-268236 A
Patent Document 6: JP 2006-286700 A

SUMMARY OF INVENTION

Technical Problem

The present invention has been made to solve the above problem. An object of the present invention is to provide an inspection apparatus and inspection method that can inspect whether a foreign matter or a defect is present inside a wafer container more certainly than visual inspection by a person.

Solution to Problem

To solve the above problem, the present invention provides an inspection apparatus for inspecting a container comprising a light-transmittable transparent portion and configured to house a wafer, the apparatus comprising:
  a flat lamp provided to irradiate a portion to be inspected including at least a part of the transparent portion of the container with light; and
  a camera provided to face the flat lamp across the portion to be inspected of the container and configured to image the portion to be inspected so as to detect a foreign matter and/or a defect in the portion to be inspected of the container.

According to the inventive inspection apparatus, an image of the portion to be inspected obtained by irradiating the portion to be inspected including a light-transmittable portion of the wafer container with light from the flat lamp can be imaged with the camera, and consequently a foreign matter and/or a defect in the portion to be inspected of the container can be detected with this camera. As a result, whether a foreign matter or a defect is present inside the wafer container can be inspected more certainly than visual inspection by a person.

It is preferable that the container have a container body, the container body have a bottom face, an opening facing the bottom face, and aside face between the bottom face and the opening,
  the flat lamp be provided to irradiate an outside of the bottom face and at least a part of an outside of the side face, as the portion to be inspected, with light, and
  the camera be provided to image an inside of the container body through the opening of the container body.

Such an inspection apparatus can easily detect a foreign matter and/or a defect inside the bottom face and inside the side face of the container body, if present.

The container body snag be composed of the transparent portion, a semi-transparent portion, and a colored portion.

Even when the container body has the semi-transparent portion and the colored portion in addition to the transparent portion, the inventive inspection apparatus can easily detect a foreign matter and/or a defect inside the container body, if present.

In this case, the camera is preferably provided to image the inside of the container body from a lower side.

Such an inspection apparatus can prevent contamination of an inside the container body with foreign matters such as a particle during the inspection.

It is also acceptable that
  the container comprises a lid for sealing the container,
  the lid has: a lid front face as an outer surface of the container; and a lid back face being a back side of the lid front face, and the flat lamp is provided to illuminate the lid front face or the lid back face of the lid, as the portion to be inspected.

As noted above, using the inventive inspection apparatus can inspect not only the container body but also the lid.

The inspection apparatus can further comprise a holder configured to hold the container, wherein
the holder comprises a rotation mechanism configured to rotate the container relative to the flat lamp and the camera.

By using the inspection apparatus further including a holder including such a rotation mechanism, the container can be inspected with one flat lamp and one camera, for example.

The camera can be configured to detect a transmitted light transmitted through the transparent portion of the container, a reflected light from a part of the container, or both of the transmitted light and the reflected light.

As noted above, a camera detecting not only the transmitted light but also the reflected light can also be used as the camera.

The inspection apparatus can further comprise a bar lamp provided to face the flat lamp across the portion to be inspected of the container.

By using the inspection apparatus including such a bar lamp, there can be further improved visibility for a foreign matter, etc. that can be present in the portion to be inspected of the container.

The present invention also provides an inspection method for detecting a foreign matter and/or a defect in a container comprising a light-transmittable transparent portion and configured to house a wafer, the method comprising:
preparing an inspection apparatus comprising a flat lamp and a camera;
providing the flat lamp so as to irradiate a portion to be inspected including at least a part of the transparent portion of the container with light, and providing the camera so as to face the flat lamp across the portion to be inspected of the container;
irradiating the portion to be inspected of the container with light from the flat lamp; and
imaging the portion to be inspected with the camera to detect a foreign matter and/or a defect in the portion to be inspected of the container.

According to the inventive inspection method, an image of a portion to be inspected obtained by irradiating the portion to be inspected having a light-transmittable portion of the wafer container with light from the flat lamp can be imaged with the camera, and consequently this camera can detect a foreign matter and/or a defect in the portion to be inspected of the container. As a result, whether a foreign matter or a defect is present inside a wafer container can be inspected more certainly than visual inspection by a person.

It is preferable that:
the container, as an inspection target, comprise a container body having a bottom face, an opening facing the bottom face, and a side face between the bottom face and the opening,
an outside of the bottom face and at least a part of an outside of the side face, as the portion to be inspected, be irradiated with light from the flat lamp, and
an inside of the container body be imaged through the opening by using the camera to inspect the container body.

According to such an inspection method, there can be easily detected a foreign matter and/or a defect inside a bottom face and inside a side face of the container body, if present.

As the container body, those comprising the transparent portion, a semi-transparent portion, and a colored portion can be inspected, for example.

Even when the container body has the semi-transparent portion and the colored portion in addition to the transparent portion, according to the inventive inspection method, there can be easily detected a foreign matter and/or a defect inside the container body, if present.

In this case, the opening of the container body is preferably disposed downward and is imaged from a lower side with the camera.

Such a configuration can prevent contamination of an inside the container body with foreign matters such as a particle during the inspection.

It is also acceptable that:
the container comprising a lid for sealing the container is inspected, the lid has a lid front face as an outer surface of the container and a lid back face being a back side of the lid front face, and
each of the lid front face and the lid back face of the lid is imaged with the camera to inspect the lid while: irradiating one of the lid front face or the lid back face of the lid with light from the flat lamp; then turning over the lid; and irradiating the other of the lid front face or the lid back face with light.

As noted above, according to the inventive inspection method, not only the container body but also the lid can be inspected.

The inspection apparatus further comprising a holder configured to hold the container and comprising a rotation mechanism configured to rotate the container relative to the flat lamp and the camera can be used, and
the container can be rotated with the rotating mechanism of the holder so as to inspect the container by using the one flat lamp and the one camera.

By such a configuration, the container can be inspected with one flat lamp and one camera.

Transmitted light transmitted through the transparent portion of the container, a reflected Light from a part of the container, or both of the transmitted light and the reflected light can be detected with the camera to image the portion to be inspected so as to inspect the portion to be inspected of the container.

As noted above, a camera detecting not only the transmitted light but also the reflected light can also be used as the camera.

A foreign matter, a cracking, a chip, and/or a defect of a part in the container can be detected by using the camera to inspect the portion to be inspected of the container.

As noted above, according to the inventive inspection method, a foreign matter, a cracking, a chip, and/or a defect of a part in the container, for example, can be detected.

A bar lamp can be provided to face the flat lamp across the portion to be inspected of the container, and
the portion to be inspected of the container can be irradiated with from the bar lamp, in addition to the flat lamp.

Such a configuration can further improve visibility of a foreign matter that can be present in the portion to be inspected of the container.

Advantageous Effects of Invention

As noted above, according to the inventive inspection apparatus, an image of a portion to be inspected obtained by irradiating the portion to be inspected having a light-transmittable portion of the wafer container with light from the flat lamp can be imaged with the camera, and consequently detect a foreign matter and/or a defect in the portion to be inspected of the container can be detected with this camera. As a result, whether a foreign matter or a defect is present inside a wafer container can be inspected more certainly than visual inspection by a person.

Therefore, the inventive inspection apparatus can prevent problems of: variation of the inspection results due to factors such as skill and physical condition of the inspection operator; and load of the inspection operator with inspection for a long time.

A container that has passed the inspection with the inventive inspection apparatus can house a silicon wafer with high cleanness until use in a device process with keeping its high cleanness. Therefore, by using the inventive inspection apparatus, a silicon device with higher performance can be provided.

In addition, according to the inventive inspection method, an image of a portion to be inspected obtained by irradiating the portion to be inspected having a light-transmittable portion of the wafer container with light from the flat lamp can be imaged with the camera, and consequently a foreign matter and/or a defect in the portion to be inspected of the container can be detected. As a result, whether a foreign matter or a defect is present inside a wafer container can be inspected more certainly than visual inspection by a person.

Therefore, the inventive inspection method can prevent problems of: variation of the inspection results due to factors such as skill and physical condition of the inspection operator; and load of the inspection operator with inspection for a long time.

A container that has passed the inspection with the inventive inspection method can house a silicon wafer with high cleanness until use in a device process with keeping its high cleanness. Therefore, by adopting the inventive inspection method, a silicon apparatus with higher performance can be provided.

BRIEF DESCRIPTION OF DRAWINGS

FIG. 1 is a schematic perspective view illustrating an example of the inventive inspection apparatus.

FIG. 2 is a schematic perspective view illustrating an example of a container body that can be inspected with the inventive inspection apparatus.

FIG. 3 is a schematic exploded perspective view illustrating an example of a container that can be inspected with the inventive inspection apparatus.

FIG. 4 is a schematic view of an image of an inside of an example of a bottom face of a container imaged with the inventive inspection apparatus.

FIG. 5 is a schematic side view illustrating another example of the inventive inspection apparatus.

FIG. 6 is a schematic plane view illustrating the inspection apparatus in FIG. 5.

FIG. 7 is a schematic perspective view illustrating another example of the inventive inspection apparatus.

FIG. 8 is a flowchart of an inspection method of Examples.

FIG. 9 is a schematic arrangement view illustrating one inspection apparatus of Example 1.

FIG. 10 is a schematic arrangement view illustrating another inspection apparatus of Example 1.

FIG. 11 is a schematic arrangement view illustrating an inspection apparatus of Example 2.

FIG. 12 is a schematic view illustrating one inspection method of Comparative Example 1.

FIG. 13 is a schematic view illustrating another inspection method of Comparative Example 1.

DESCRIPTION OF EMBODIMENTS

Even with a clean wafer, the presence of a foreign matter an a FOSB is a risk of a foreign matter adhering to a housed wafer, leading to increase in particles on the wafer and contamination. However, at present, there is no method for detecting a foreign matter other than visual inspection. The visual inspection causes a mental load of the inspection operator and also causes failure to detect the foreign matter. This inspection, which is an operation requiring many steps, is a process for which automation is desired.

Thus, as noted above, there have been demands for developments of an inspection apparatus and inspection method that can inspect whether a foreign matter or a defect is present inside a wafer container more certainly than visual inspection by a person.

The present inventors have earnestly made study on the above problem, and consequently found that, in an inspection apparatus for inspecting a container including a light-transmittable transparent portion and configured to house a wafer, such as FOSB, by providing a flat lamp to irradiate a portion to be inspected including at least a part of the transparent portion of the container with light; and by providing a camera for imaging and inspection so as to face the flat lamp across the portion to be inspected or the container and configured to image the portion to be inspected, there can be easily and certainly detected a foreign matter and/or a defect adhering to an inner face of the wafer container. This finding has led to complete the present invention.

Specifically, the present invention is an inspection apparatus for inspecting a container comprising a light-transmittable transparent portion and configured to house a wafer, the apparatus comprising:
a flat lamp provided to irradiate a portion to be inspected including at least a part of the transparent portion of the container with light; and
a camera provided to face the flat lamp across the portion to be inspected of the container and configured to image the portion to be inspected so as to detect a foreign matter and/or a defect in the portion to be inspected of the container.

In addition, the present invention is an inspection method for detecting a foreign matter and/or a defect in a container comprising a light-transmittable transparent portion and configured to house a wafer, the method comprising
preparing an inspection apparatus comprising a flat lamp and a camera;
providing the flat lamp so as to irradiate a portion to be inspected including at least a part of the transparent portion of the container with light, and providing the camera so as to face the flat lamp across the portion to be inspected of the container;
irradiating the portion to be inspected of the container with light from the flat lamp; and
imaging the portion to be inspected with the camera to detect a foreign matter and/or a defect in the portion to be inspected of the container.

Should be noted that Patent Document 6 describes a method for checking presence/absence of an adhesive material in a semiconductor-carrying container including sprinkling a water-soluble powder over the semiconductor-carrying container to check presence/absence of an adhesive material in the semiconductor-carrying container, and precisely cleaning a surface of the carrying container onto which no adhesive material adheres. However, Patent Document 6 does not propose an inspection apparatus nor method for the semiconductor-carrying container using a flat lamp.

Hereinafter, the present invention will be described in detail, but the present invention is not limited thereto.

Inspection Apparatus

The inventive inspection apparatus is an inspection apparatus for inspecting a container including a light-transmittable transparent portion and configured to house a wafer, the apparatus including:
  a flat lamp provided to irradiate a portion to be inspected including at least a part of the transparent portion of the container with light; and
  a camera provided to face the flat lamp across the portion to be inspected of the container and configured to image the portion to be inspected so as to detect a foreign matter and/or a defect in the portion to be inspected of the container.

The flat lamp can have a structure including, for example, a light-guide diffusing plate and a light source, such as an LED, provided therearound.

The camera can have a structure including, for example, a lens for light focus and a camera body having an imaging device, such as a CCD image sensor and a CMOS image sensor.

By providing the flat lamp so as to irradiate the portion to be inspected including at least a part of the transparent portion of the container with light and by providing the camera so as to face the flat lamp across the portion to be inspected, a foreign matter and/or a defect inside the container can be more easily and certainly detected with the camera. It is difficult to detect such a foreign matter and/or a defect with a conventional light source such as an operating lamp such as a halogen lamp or a fluorescent lamp. As a result, by using the inventive inspection apparatus, whether a foreign matter or a defect is present inside a wafer container can be more certainly detected than visual inspection by a person.

For example, by automatically comparing the image obtained by imaging with the camera with an image of a clean container without a foreign matter and a defect, and judging a case where an object having a size and contrast being equal to or larger than a standard value is included as presence of a foreign matter and/or defect, whether a foreign matter or a defect is present inside the container being an inspection target can be easily and automatically judged. This judgement can be performed by an image process judgement based on an AI or a rule base, for example.

Therefore, the inventive inspection device can prevent problems of: variation of the inspection results due to factors such as skill and physical condition of the inspection operator; and load of the inspection operator with inspection for a long time.

A container that has passed the inspection with the inventive inspection apparatus can house a silicon wafer with high cleanness until use in a device process with keeping its high cleanness. Therefore, using the inventive inspection apparatus can provide a silicon apparatus with higher performance.

Hereinafter, an example of the inventive inspection apparatus will be described with reference to Drawings.

FIG. 1 is a schematic perspective view illustrating an example of the inventive inspection apparatus.

An inspection apparatus 10 illustrated in FIG. 1 includes a flat lamp 1 and a camera 2. The inspection apparatus 10 further includes an inspection chamber 4 housing the flat lamp 1 and the camera 2.

The flat lamp 1 is provided on the highest part (ceiling part) of the inspection chamber 4 of the inspection apparatus 10.

The camera 2 includes a camera body 21 having an image sensor and a lens 22 for light focus. The camera 2 is provided on a lower part of the inspection chamber 4 of the inspection apparatus 10. The camera 2 can image an inspection target with the camera body 21 based on the light focus by the lens 22.

Between the flat lamp 1 and the camera 2 in the inspection chamber 4, a container 100 as an inspection target is to be loaded. The flat lamp 1 and the camera 2 are provided so as to face each other across a portion to be inspected 102 including a transparent portion 101 of the container 100 to be loaded.

The container 100 as the inspection target can include, for example, a container body 110 illustrated in FIG. 2. The container body 110 can have, for example, a bottom face 111, an opening 112 facing the bottom face 111, and four side faces 113 between the bottom face 111 and the opening 112. That is, the container 110 has five inner faces, constituted with an inner face of the one bottom face 111 on the container side and inner faces of the four side faces 113.

The container body 110 is configured to be able to house a wafer 200. Specifically, the container body 110 illustrated in FIG. 2 includes thin-plate-shaped housing tools 114 for supporting the wafer 200 on each of a pair of the side faces 113 facing each other. The container body 110 illustrated in FIG. 2 has six pairs of housing tools 114. A structure for housing the wafer 200 is not limited to the structure of the thin-plate-shaped housing tool 114 illustrated in FIG. 2, and may be, for example, a comb-tooth-shaped member or a groove provided on the two side faces 113 facing each other. The housing tool 114 may have a curved portion.

The container body 110 has a part of the light-transmittable transparent portion 101 on the bottom face 111. The container body 110 may have the part of the transparent portion 101 on not only the bottom face 111 but also on the side face 113 and/or the housing tool 114.

The container body 110 may further have a semi-transparent portion and a colored portion in addition to the transparent portion 101. For example, the housing tool 114 may be a white housing tool for housing a wafer. The housing tool 114 illustrated in FIG. 2 is a part of the transparent portion 101. Inside the four side faces 113 of the container body 110, an external part can be attached, or a colored part can be welded.

The container body 100 can have, for example, a lid 120 illustrated in FIG. 3 separately from the container body 110. The container 100 may be constituted with a container body 110 and the lid 120, as illustrated in FIG. 3. The lid 120 illustrated in FIG. 3 has a lid front face 121 as an outside face of the container 100 and a lid back face 122 being a back side of the lid front face. On the lid back face 122, a part called a wafer holding part. 123 is assembled. The lid 120 is configured to be attached to the opening 112 of the container body 110, and to seal the container 100.

The lid 120 illustrated in FIG. 3 includes at least a part of the transparent portion 101 of the container 100. The lid 120 can further include the semi-transparent portion and the colored portion in addition to the transparent portion 101. The wafer holding part 123 may be at least a part of the colored portion.

The inspection target of the inspection apparatus 10 can be the container body 110, or can be the lid 120. When the inspection target is the container body 110, the portion to be inspected can be the bottom face 11, side faces 113, and/or housing tool 114 of the container body 110. When the inspection target is lid 120, the portion to be inspected can be the lid front face 121 and/or the lid back face 122. In particular, since the wafer holding part 123 is assembled on the lid back face 122, the portion to be inspected is preferably both of the lid front face 121 and the lid back face 122.

As above, the container 100 having a substantially cubic shape has been described with reference to FIG. 3, but the container 100 that can be inspected with the inventive inspection apparatus 10 is not limited to the container illustrated in FIG. 3. For example, in the container 100, the bottom face 111 and/or side faces 113 of the container body 110 and the lid 120 may have a curved portion.

Hereinafter, a case where the inspection target is the container body 110 will be described as an example.

The flat lamp 1 illustrated in FIG. 1 is provided to irradiate an outside of the bottom face 111 (illustrated in FIG. 2) of the container body 110, as the portion to be inspected 102, with light.

The flat lamp 1 illustrated in FIG. 1 can uniformly irradiate the outside of the bottom 111 of the container body 110 with light.

In the inspection apparatus 10 illustrated in FIG. 1, the camera 2 is provided to image the inside of the bottom face 111 of the container body 110 through the opening 112 of the container body 110. In more detail, the camera 2 is provided to image the inside of the bottom face 111 of the container body 110 from the lower side. Such arrangement can prevent contamination of an inside the container body with foreign matters such as a particle during the inspection.

FIG. 4 illustrates an example of an image obtained by using the inspection apparatus 10 illustrated in FIG. 1 to image the bottom face 111 of the container body 110 illustrated in FIG. 2.

The image, illustrated in FIG. 4, of she bottom face 111 of the container body 110 as the portion to be inspected 102 has an outer periphery composed of a semi-transparent portion 104. The transparent portion 101 is present in a portion surrounded by the semi-transparent portion 104, and a colored portion 105 is included therein.

In the image illustrated in FIG. 4, the housing tool 114 as described above is imaged as a part of the transparent portion 101.

In the image illustrated in FIG. 4, three foreign matters 103 are imaged. The presence of the three foreign matters 103 can be automatically detected by performing an image process judgement on this image with comparing an image of a clean bottom face 121 without foreign matter or defect.

By using the flat lamp 1, a foreign matter present on, for example, the colored portion 105 can also be detected, as illustrated in FIG. 4, even when the portion to be inspected 102 includes the semi-transparent portion 104 and the colored portion 105.

The inspection apparatus 10 illustrated in FIG. 1 has, for example, the following feature in addition to the feature described above.

In the inspection apparatus 10 illustrated in FIG. 1, the flat lamp 1 has a larger area than an area of the bottom face 111 of the container 100. Therefore, the flat lamp 1 can irradiate not only the outside of the bottom face 111 of the container body 110 illustrated in FIG. 2 but also at least a part of an outside of the side face 113 with light.

The camera 2 is configured to detect: a transmitted light transmitted through the bottom face 111, which is a part of the transparent portion 101, of the container body 110; and a reflected light from the semi-transparent portion 104 and colored portion 105 of the container body 110.

The inspection apparatus 10 having such a configuration and illustrated in FIG. 1 can more certainly detect a foreign matter or defect when the foreign matter or defect is present inside the container body 110, particularly even when the foreign matter or the defect is present on the colored portion 105.

Even in the case where the inspection target is the lid 120 illustrated in FIG. 3 and the lid front face 121 or lid back face 122 of the lid 120 is the portion to be inspected 102, a foreign matter 103, etc. can be certainly detected similarly to the above.

When the lid front face 121 or lid back face 122 of the lid 120 is the portion to be inspected 102, the flat lamp 1 described above can be provided to irradiate the lid front face 121 or lad back face 122 of the lid 120.

Although the inspection apparatus 10 illustrated in FIG. 1 includes one flat lamp 1 and one camera 2, the inventive inspection apparatus 10 may include a plurality of flat lamps 1 and/or a plurality of cameras 2.

In some cases, the foreign matter, etc. can be more certainly detected by illuminating the container from a plurality of directions rather than illuminating the container form one direction.

With some inside structures of the container 100, the foreign matter, etc. can be more certainly detected by imaging the container with a plurality of cameras fixed in various elevation angles rather than imaging the container with one camera fixed in an elevation angle. For example, when the inspection target is the container body 110, an efficient method is providing one camera on the opening 112 side of the container body 110 and facing perpendicular to the bottom face 111; and providing another camera facing one side face 113 from an oblique direction.

In addition, when the inspection target is the container body 110, imaging the container body 110 with a plurality of cameras with different elevation angles can simultaneously inspect the bottom face 111 and at least one side face 113 as the portions to be inspected 102.

For example, when the inspection target is the container body 110 it is more efficient that flat lamps 1 are provided in total two directions on a ceiling portion of the inspection chamber 4 of the inspection apparatus 10 and on any one face of four directions crossing with the ceiling portion at right angles and the container body 110 is imaged with a plurality of cameras with different elevation angles, which can simultaneously inspect the bottom face 111 and at least one side face 113 of the container body 110.

When the bottom face 111 and the at least one side face 113 are simultaneously inspected, one camera 2 is preferably provided, as illustrated in FIG. 1, to direct from a lower side of the opening 112 of the container body 110 to an upper side of the perpendicular direction, and another camera 2 is preferably provided to direct from the lower side of the opening 112 of the container body 110 to an oblique direction of the flat lamp 1 provided on the side face of the inspection chamber 4. The former camera is provided as the camera 2 to detect a foreign matter adhering to the inner face of the container body 110.

In addition, by providing the flat lamps 1 in two directions of the outside of the bottom face 11 of the container body 110 and the outside of one face of the four side faces 113, the total five faces of the bottom face 111 and four side faces 113 of the container body 110 can be efficiently illuminated.

Alternatively, the inspection apparatus 10 can include a holder including a rotation mechanism that can rotate the container 100 relative to the flat lamp 1 and the camera 2.

By using the inspection apparatus 10 further including the holder including such a rotation mechanism, the container 100 can be inspected just by using one flat lamp 1 and one camera 2, for example. Of course, the inventive inspection apparatus 10 can use the holder including the rotation mechanism and a plurality of the flat lamps 1 and/or a plurality of the cameras 2 in combination.

The holder is not limited to the above aspect. The holder may comprise, for example, a rotation table for holding the container 100, a motor connected to this rotation table and for rotating this rotation table, and a mechanism for stopping the rotation table at any angle.

The inspection apparatus 10 including such a rotation mechanism will be described with reference to FIG. 5 and FIG. 6.

FIG. 5 and FIG. 6 are schematic side view and plane view illustrating an example of the inventive inspection apparatus, respectively.

The inspection apparatus 10 illustrated in FIG. 5 and FIG. 6 includes: two flat lamps 1a and 1b each provided on the ceiling portion and one side face of the inspection chamber 4; a camera 2a fixed so as to direct front to the flat lamp 1a provided on the ceiling portion of the inspection chamber 4; and a camera 2b fixed so as to direct a side crossed by the ceiling portion of she inspection chamber 4 and the side face on which the flat lamp 1b is provided.

The inspection apparatus 10 illustrated in FIG. 6 further includes a holder 3. The holder 3 includes: a rotation table 32 as a holding part for supporting the container 100; and a rotation mechanism 34 mounted thereon.

The rotation mechanism 34 has: a plurality of posts 34a for supporting the rotation table 32; and a disk bearing 34b for supporting the rotation table 32 via the posts 34a. The rotation table 32 is connected to a motor not illustrated and a rotation controlling mechanism not illustrated. The rotation mechanism 34 and the motor not illustrated are configured to rotate the rotation table 32 in a direction illustrated by an arrow 32b in FIG. 6, for example. The rotation controlling mechanism is configured to stop the rotation table 32 at any angle.

The holder 3 further includes: an intermediate stage 31 for rotatably supporting the disk bearing 34b; and an upper stage 33 to stabilize the rotation of the rotation table 32.

The rotation table 32 can be rotated with the rotation mechanism 34 in the direction of the arrow 32b in FIG. 6, for example, and the rotation table 32 and the container body 110 supported thereon can be stooped at any angle relative to the flat lamps 1a and 1b and the cameras 2a and 2b.

The cameras 2a and 2b are provided on a lower side than the intermediate stage 31.

The rotation table 32 has an opening 32a. Thus, as illustrated in FIG. 6, the flat lamp 1a provided on the ceiling portion of the inspection chamber 4 faces the camera 2a. When the container body 110 including the light-transmittable transparent portion 101 is placed on the rotation stage 32, a part of light from the flat lamp 1a reaches the camera 2a as a transmitted light passed through the bottom face 111 of the container body 110. Therefore, the camera 2a can image the bottom face 111 of the container body 110.

As illustrated in FIG. 5, the camera 2b faces, via the opening 32a of the rotation table 32, a proximity of a side crossed by the ceiling portion of the inspection chamber 4 and the side face on which the flat lamp 1b is provided. A part of transmitted light from the flat lamps 1a and 1b and passed through the side face 113 of the container body 110, and a part of a reflected light from the flat lamps 1a and 1b and reflected on a part of the container body 110 can reach the camera 2a. Furthermore, the rotation mechanism 34 can rotate the container body 110 and can stop the container body 110 at a target angle. Accordingly, the camera 2b can image the side face 113 of the container body 110 and a portion crossed by the side face 113 and the bottom face 111.

The inventive inspection apparatus can have various forms. Hereinafter, other modified examples of the inventive inspection apparatus will be described with reference to FIG. 7.

The inspection apparatus 10 illustrated in FIG. 7 has a first inspection chamber 4a and a second inspection chamber 4b. The first inspection chamber 4a has the same construction as the inspection chamber 4 of the inspection apparatus 10 that has been described with reference to FIG. 5 and FIG. 6. In particular, the first inspection chamber 4a houses a holder 3a configured to hold the container body 110 thereon so enable to rotate the container body 110.

Meanwhile, the second inspection chamber 4b houses: a flat lamp 1c provided on one side face; a camera 2c provided to face this flat lamp 1c; and a holder 3b configured to hold the lid 120 and to enable to rotate the lid 120.

In the inspection apparatus 10 of such an example, the container body 110 and the lid 120 can be simultaneously loaded and each of thereof can be inspected.

The inventive inspection apparatus 10 can include constituents other than the constituents described above. For example, the inventive inspection apparatus 10 may further comprise a apparatus electrically connected to a camera body 2 and configured to perform an image processing judgement of the image of the portion to be inspected obtained by the camera body 2.

Alternatively, the inventive inspection apparatus 10 can further include a bar lamp provided to face the flat lamp across the portion to be inspected 102 of the container 100.

By using such a bar lamp and the flat lamp 1 in combination, illuminance of the portion to be inspected 102 of the container body 110 can be further increased. Accordingly, visibility of a foreign matter, etc. that can be present in the portion to be inspected 102 can be further improved. For example, even when the inspection target is a container body 110 having a comb-tooth part including a curved portion as the housing tool 114, a deep portion of the comb-tooth part 114 (near a contact point with the side face) can be sufficiently illuminated, and the camera 2 can image this portion.

Inspection Method

The inventive inspection method is an inspection method for detecting a foreign matter and/or a defect in a container comprising a light-transmittable transparent portion and configured to house a wafer, the method comprising:
  preparing an inspection apparatus comprising a flat lamp and a camera;
  providing the flat lamp so as to irradiate a portion to be inspected including at least a part of the transparent portion of the container with light, and providing the camera so as to face the flat lamp across the portion to be inspected of the container;
  irradiating the portion to be inspected of the container with light from the flat lamp; and imaging the portion to be inspected with the camera to detect a foreign matter and/or a defect in the portion to be inspected of the container.

According to the inventive inspection method, an image of a portion to be inspected obtained by irradiating the portion to be inspected having the light-transmittable portion of the wafer container with light from the flat lamp can be imaged with the camera, and consequently a foreign matter and/or a defect in the portion to be inspected of the container can be detected by this camera. As a result, whether a foreign matter or a defect is present inside the wafer container can be inspected more certainly than visual inspection by a person.

For example, the image obtained by imaging with the camera is automatically compared with an image of a clean container without a foreign matter and a defect, and a case where an object having a size and contrast being equal to or larger than a standard value is included is judged as presence of a foreign matter and/or defect. Such a judgement can easily and automatically judge whether a foreign matter or a defect is present inside the container being an inspection target.

Therefore, the inventive inspection method can inhibit problems of: variation of the inspection results due to factors such as skill and physical condition of the inspection operator; and load of the inspection operator with inspection for a long time. As a result of the present invention, expected are: reduction of labor to assemble a wafer container and to inspect an adhering material; reduction of load of an inspection operator; and prevention of failure to detect an adhering foreign matter.

Also, a container that has passed the inspection by the inventive inspection method can house a silicon wafer with high cleanness until use in a device process with keeping its high cleanness. Therefore, by adopting the inventive inspection method, a silicon device with higher performance can be provided.

In addition, the inventive inspection method can minimize a mounting number of necessary flat lamps and cameras required for an apparatus that automatically detects a foreign matter adhering to an inner face of the wafer container and/or a defect, which can minimize an apparatus cost.

The inventive inspection method can be performed by, for example, using the inventive inspection apparatus described above.

By the inventive inspection method, a foreign matter, a cracking, a chip, and/or a defect of a part in the container can be detected by using the camera to inspect the portion to be inspected of the container, for example.

Hereinafter, an example of the inventive inspection method will be more specifically described with reference again to FIGS. 1 to 3, FIG. 5, and FIG. 6.

For example, the inventive inspection method can separately inspect the container body 110 and lid 120 of the container 100. In this case, the container body 110 and the lid 120 are separately carried in the inspection apparatus 10.

When the container body 110 is the inspection target, the container body 110 is preferably carried in the inspection chamber 4 so that the opening 112 of the container body 110 is the lower side and the bottom face 111 is the upper side from the above reason.

With the inside of the bottom face 111 of the container body 110, for example, as illustrated in FIG. 1, the outside of the bottom face ill is irradiated with light from the flat lamp 1 provided on an upper side thereof, the inside of the bottom face 111 is imaged with the camera 2 provided directed to the upper side of the perpendicular direction from the lower side of the opening 112 of the container body 110, which can inspect a foreign matter adhering thereto and/or a detect.

When the portion to be inspected 102 is the side face 113, a foreign matter adhering to the inside cannot be detected with the camera 2 from a side similarly facing the bottom face 111 (the opening 112 relative to the bottom face 111). However, by using the camera 2 provided in an oblique direction from the opening 112 side, such a foreign matter can be imaged. In this case, the camera 2 is also provided so as to face the flat lamp 1 with sandwiching the side face 113 as the portion to be inspected 102 between them.

For example, with the four side faces 113 of the container body 110, as the arrangement illustrated in FIG. 5 and FIG. 6, a flat lamp 1b is provided on the outside of one side face 113 as the portion to be inspected, the one side face 113 is irradiated with light by this flat lamp 1b, and the inside of the one side face 113 is imaged with the camera 2b provided directed to the inside of the side face 113 (the side face where the flat lamp 1b is provided in the inspection chamber 4) from the lower side of the opening 112, which can inspect a foreign matter adhering to the inside of the side face 113 and/or a detect.

With the other three faces of the side faces 113, by rotating the central part of the container body 110 at each 90° relative to the direction in which the flat lamp 1b on the side face 113 side of the container body 110 is provided, a foreign matter adhering to the inner faces of the three side faces 113 and/or a defect can be detected by the camera 2b. For this rotation, the holder 3 including the rotation mechanism 34 illustrated in FIG. 5 and FIG. 6 can be used, for example. When a foreign matter on a concave-convex portion in the container body 110 is to be detected, the 90° may not be an optimal rotation angle. In this case, it is desired to stop the rotation at any angle and to inspect the foreign matter at an optimal angle.

On the side face 113 of the container body 110, an external part may be attached, or a colored part may be welded. In these cases, the side face 113 has a shady portion with illuminated from the outside and transparent portion (transparent portion) 101. In this case, the inspection apparatus 10 having arrangement as illustrated in FIG. 5 and FIG. 6 is preferably used. With such an inspection apparatus 10, it is more effective method that: for the shady portion in the side face 113, a flat lamp 1a is provided on the outside of the bottom face 111 of the container body 110 and its reflected light is imaged with the camera 2b provided to direct to an oblique direction relative to the side face 113; and on the other hand, for the transparent portion 101, another flat lamp 1b is provided outside the side face 113, and its transmitted light is imaged with the camera 2b provided to direct to an oblique direction relative to the side face 113.

For the lid 120, a foreign matter adhering to the lid back face 122 and/or a defect can be detected by providing the lid 120 in the inspection chamber 4 so that the flat lamp 1 is positioned on the lid front face 121 side and the camera 2 is positioned on the lid back face 112 side and by imaging the lid 120 based on the transmitted light from the flat lamp 1 and passed through the lid 120 with camera 2. Then, rotating a member holding the lid 120 (for example, the holder 3b illustrated in FIG. 7) at 180° turns the lid 120 over to allow the camera 2 to be positioned on the lid front face 121 side, and the flat lamp 1 is positioned on the lid back face 112 side. By inspection in this state as above, a foreign matter adhering to the lid front face 121 and/or a defect can be detected.

In the inventive inspection method described above, by using the inspection apparatus 10 comprising the holder 3 including the rotation mechanism 34 as illustrated in FIG. 5 and FIG. 6, the portion to be inspected 102 of the container 100 can be appropriately selected and provided between the flat lamps 1 (1a and 1b) and the cameras 2 (2a and 2b).

Meanwhile, when the inspection target is the container body 110, by providing two flat lamps 1 (1a and 1b) and two or more cameras 2 (2a and 2b), the bottom face 111 and one side face 113 of the container body 110 can be inspected with the separate flat lamps 1 and the separate cameras 2. Therefore, in this case, the inspection of the bottom face 111 of the container-body 110 and the inspection of one side face 113 may be separately performed, or may be simultaneously performed. Such simultaneous inspection is more preferable because the inspection time is reduced.

Also, the bar lamp can be provided so as face the flat lamp 1a across the portion to be inspected 102 of the container body 110, which enables the bar lamp, in addition to the flat lamp 1a, to irradiate the portion to be inspected 102 of the container 100 with light. Such a configuration can further increase illuminance for the portion to be inspected 102 of the container 100. Such a configuration can further improve visibility of a foreign matter that can be present in the portion to be inspected 102. Per example, even when the inspection target is a container body 110 having a comb-tooth portion including a curved portion as the housing tool 114, a deep portion of the comb-tooth portion 114 (near a contact point with the side face) can be sufficiently illuminated and this portion can be imaged with the camera 2.

A wafer that can be housed in the container that can be inspected with the inventive inspection apparatus and inspection method is not particularly limited. The container can house, for example, a silicon wafer, an SOI wafer, a wafer containing a compound semiconductor (for example, an epitaxial wafer), various device wafers, etc.

EXAMPLE

Hereinafter, the present invention will be specifically described by using Examples and Comparative Examples, but the present invention is not limited thereto.

In the following Examples and Comparative Examples, a wafer container (hereinafter, referred to as the FOSB) was inspected. Prepared as inspection targets were 30 BOXes of FOSBs in which foreign matters (micro foreign matter, linear foreign matter, and transparent foreign matter) adhered to an inside thereof for each of Example 1 and Comparative Example 1. The prepared FOSBs had a container body (hereinafter, referred to as the FOSB body) having the same structure as described with reference to FIG. 2; and a lid having the same structure as described with reference to FIG. 3.

Example 1

In Example 1, the FOSB was inspected in accordance with a judgement flowchart shown in FIG. 8. A specific flow was as follows.

[1] Imaging

By the following procedure, imaged were: inner faces of bottom face and side face of the FOSB body; and a lid front face and lid back face of the lid.

(A) Imaging of Bottom Face

As illustrated in FIG. 9, a flat lamp 1 on which white LED light sources were entirely attached was provided downward on a ceiling portion of an inspection chamber 4. In addition, the FOSB body 110 was provided 200 mm to a lower side of the flat lamp 1 so that an opening 112 directed downward. Furthermore, 900 mm to the lower side of the bottom face 111 of the FOSB body 110, a camera 2 having a camera body 21 and a lens 22 was provided upward.

Used as the flat lamp 1 was a lamp having a large area so as to illuminate an entirety of the bottom face ill of the FOSB body 110. For a lamp power, a variable voltage power with an output voltage of 12 V to 24 V was used, and illumination was performed with an illuminance of 18.5 V. The imaging was performed with the camera 2, which was a monochrome area camera with 21 million pixels, with a shutter speed of 1 msec. As the lens 22, a standard lens with a focus distance of 50 mm was used, and the imaging was performed with an aperture of F8.

(B) Imaging of Side Face (Shady Portion Due to External Part, Etc.)

As illustrated in FIG. 10, a flat lamp 1 on which white LED light sources were entirely attached was provided downward on a ceiling portion of an inspection chamber 4. In addition, the FOSB body 110 was provided 200 mm to a lower side of the flat lamp 1 so that an opening 112 directed downward. Used as the FOSB body 110 had the same structure as described with reference to FIG. 2. Furthermore, at a position of 990 mm to the lower side and 825 mm to the left of one apex of the bottom face 111 of the FOSB body 110, a camera 2 was provided so that the elevation angle was 48° right-upward.

Used as the flat lamp 1 was a lamp having a large area so as to illuminate an entirety of the bottom face 111 of the FOSB body 110. For a lamp power, a variable voltage power with an output voltage of 12 V to 24 V was used, and illumination was performed with an illuminance of 18.5 V. The imaging was performed with the camera 2, which was a monochrome area camera with 21 million pixels, with a shutter speed of 16.7 msec. As the lens 22, a standard lens with a focus distance of 50 mm was used, and the imaging was performed with an aperture of F16.

(C) Imaging of Lid

The lid front face and the lid back face were imaged by an inspection apparatus 10 having the same arrangement as described in FIG. 9 except that distances from the lid front face and lid back face to the camera 2 were 900 mm.

Used as the flat lamp 1 was a lamp having a large area so as no illuminate an entirety of the lid front face and lid back face. For a lamp power, a variable voltage power with an output voltage of 12 V to 24 V was used, and illumination was performed with an illuminance of 18.5 V. The imaging was performed with the camera 2, which was a monochrome area camera with 21 million pixels, with a shutter speed of 2 msec. As the lens 22, a standard lens with a focus distance of 35 mm was used, and the imaging was performed with an aperture of F3.5.

[2] Judgement

The imaged images were subjected to an image process judgement based on an AI and a rule base to inspect whether the bottom face 111 and side face 113 of the FOSB body 110, and the lid 120 had foreign matters or not.

Specifically, as illustrated in FIG. 8, micro foreign matter inspection, linear foreign matter inspection, and transparent foreign matter inspection were performed in this order. When no foreign matter was detected by each inspection, the judgement was "OK". Meanwhile, when a foreign matter was detected, the judgement was "NG". After the judgement of each inspection, the next inspection was performed. The three inspection results were output to finish the judgement.

Comparative Example 1

Visual Inspection

As illustrated in FIG. 12, under a fluorescent lamp 310 so as to illuminate the inspection face at 1700 Lx, an inspection operator 300 performed visual inspection of whether four side faces 113 and one bottom face 111 had a foreign matter. The inspection operator held and tilted the FOSB body 110 with both hands and for facilitating observation.

Thereafter, as illustrated in FIG. 13, the inspection operator 300 held the lid 120 with both hands to visually inspect a foreign matter on the front and back faces 121 and 122 of the lid 120.

These visual inspections were performed with arrangement so that a distance from eyes of the inspection operator 300 to the face to be inspected was 0.3 to 0.5 m and a distance from the fluorescent lamp 310 to the face to be inspected was 1.0 to 1.5 m.

Results

Compared were: judgement results between the visual inspection (Comparative Example 1) by one inspection operator 300 as above; and the inspection with one inspection apparatus 10 (Example 1).

Results of defective BOXes which the inspection operator 300 could detect were 83% (25 BOXes) on the micro foreign matter, 90% (27 BOXes) on the linear foreign matter, and 100% (30 BOXes) on the transparent foreign matter. On the other hand, results of defective BOXes detected by the inspection apparatus 10 was 97% (29 BOXes) on the micro foreign matter, 93% (28 BOXes) on the linear foreign matter, and 100% (30 BOXes) or the transparent foreign matter.

The following table 1 shows the above results.

TABLE 1

| | Percentage of detected BOX | |
| --- | --- | --- |
| | Inspection operator (visual) | Inspection apparatus (image process) |
| Micro foreign matter-adhering BOX | 83% | 97% |
| Linear foreign matter-adhering BOX | 90% | 93% |
| Transparent foreign matter-adhering BOX | 100% | 100% |

As obviously found from the above results, the inspection using the inspection apparatus 10 of Example 1 was able to detect the foreign matter failed to be detected by the inspection operator 300. That is, the inventive inspection apparatus and inspection method can inspect whether a foreign matter or a defect is present inside a wafer container more certainly than visual inspection by a person.

Example 2

In Example 2, the side face 113 of the FOSB body 110 was imaged in the same procedure as imaging of the side face in Example 1 except that: an apparatus illustrated in FIG. 11 was used; and a FOSB body 110 illustrated in FIG. 11 was carried in.

The inspection target in Example 2 were 30 BOXes of the FOSB body 110 having housing tools 114 including a curved portion on the side face 113, schematically illustrated in FIG. 11. Each FOSB body 110 was carried in the inspection chamber 4 as illustrated in FIG. 11 to image the side face 113 having the housing tools 114.

In addition, in Example 2, a bar lamp 5 with 500 mm×60 mm as an auxiliary lamp was additionally provided on the inspection apparatus 10 having the arrangement illustrated in FIG. 10. The bar lamp 5 was provided 680 mm to a lower side of one apex of the bottom face 111 of the FOSB body 110.

For a lamp power of the bar lamp 5, a variable voltage power with an output voltage of 12 V to 24 V was used, and illumination was performed with an illuminance of 15.5 V.

Comparative Example 2

The inspection targets in Comparative Example 2 were 30 BOXes of the FOSB body 110 having the same structure as the inspection target of Example 2. In Comparative Example 2, the inspection operator 300 inspected the side face 113 having the housing tools 114 of each FOSB body 110 by the method described with reference to FIG. 12.

Results

Results of defective BOXes which the Inspection operator 300 could detect was 83% (25 BOXes) on the micro foreign matter, 90% (27 BOXes) on the linear foreign matter, and 100% (30 BOXes) on the transparent foreign matter. On the other hand, results of defective BOXes detected by the inspection apparatus 10 was 100% (30 BOXes) on the micro foreign matter, 97% (29 BOXes) on the linear foreign matter, and 100% (30 BOXes) on the transparent foreign matter.

Thus, the FOSB body 110 having the housing tools 114 including a curved side portion on the face 113 was inspected in Example 2, and the apparatus was able to detect the foreign matter failed to be detected by the inspection operator 300 as in Example 1. That is, the inventive inspection apparatus and inspection method can inspect whether a foreign matter or a defect is present inside a wafer container more certainly than visual inspection by a person.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. An inspection apparatus for inspecting a container comprising a light-transmittable transparent portion and configured to house a wafer, the apparatus comprising:
   a flat lamp provided to irradiate a portion to be inspected including at least a part of the transparent portion of the container with light; and
   a camera provided to face the flat lamp across the portion to be inspected of the container and configured to image the portion to be inspected so as to detect foreign matter and/or a defect in the portion to be inspected of the container, wherein the camera is configured to detect a transmitted light transmitted through the transparent portion of the container, a reflected light from a part of the container, or both of the transmitted light and the reflected light.

2. The inspection apparatus according to claim 1, wherein the container has a container body,
the container body has a bottom face, an opening facing the bottom face, and a side face between the bottom face and the opening,
the flat lamp is provided to irradiate an outside of the bottom face and at least a part of an outside of the side face, as the portion to be inspected, with light, and
the camera is provided to image an inside of the container body through the opening of the container body.

3. The inspection apparatus according to claim 2, wherein the container body is composed of the transparent portion, a semi-transparent portion, and a colored portion.

4. The inspection apparatus according to claim 2, wherein the camera is provided to image the inside of the container body from a lower side.

5. The inspection apparatus according to claim 1, wherein the container comprises a lid for sealing the container,
the lid has: a lid front face as an outer surface of the container; and a lid back face being a back side of the lid front face, and
the flat lamp is provided to illuminate the lid front face or the lid back face of the lid, as the portion to be inspected.

6. The inspection apparatus according to claim 1, further comprising a holder configured to hold the container, wherein
the holder comprises a rotation mechanism configured to rotate the container relative to the flat lamp and the camera.

7. The inspection apparatus according to claim 1, further comprising a bar lamp provided to face the flat lamp across the portion to be inspected of the container.

8. An inspection method for detecting a foreign matter and/or a defect in a container comprising a light-transmittable transparent portion and configured to house a wafer, the method comprising:
preparing an inspection apparatus comprising a flat lamp and a camera;
providing the flat lamp so as to irradiate a portion to be inspected including at least a part of the transparent portion of the container with light, and providing the camera so as to face the flat lamp across the portion to be inspected of the container;
irradiating the portion to be inspected of the container with light from the flat lamp; and
imaging the portion to be inspected with the camera to detect foreign matter and/or a defect in the portion to be inspected of the container, wherein
a transmitted light transmitted through the transparent portion of the container, a reflected light from a part of the container, or both of the transmitted light and the reflected light is detected with the camera to image the portion to be inspected so as to inspect the portion to be inspected of the container.

9. The inspection method according to claim 8, wherein the container, as an inspection target, comprises a container body having a bottom face, an opening facing the bottom face, and a side face between the bottom face and the opening,
an outside of the bottom face and at least a part of an outside of the side face, as the portion to be inspected, are irradiated with light from the flat lamp, and
an inside of the container body is imaged through the opening by using the camera to inspect the container body.

10. The inspection method according to claim 9, wherein the container body comprising the transparent portion, a semi-transparent portion, and a colored portion is inspected.

11. The inspection method according to claim 9, wherein the opening of the container body is disposed downward and is imaged from a lower side with the camera.

12. The inspection method according to claim 8, wherein the container comprising a lid for sealing the container is inspected, the lid has a lid front face as an outer surface of the container and a lid back face being a back side of the lid front face, and
each of the lid front face and the lid back face of the lid is imaged with the camera to inspect the lid while: irradiating one of the lid front face or the lid back face of the lid with light from the flat lamp; then turning over the lid; and irradiating the other of the lid front face or the lid back face with light.

13. The inspection method according to claim 8, wherein the inspection apparatus further comprising a holder configured to hold the container and comprising a rotation mechanism configured to rotate the container relative to the flat lamp and the camera is used, and
the container is rotated by using the rotating mechanism of the holder so as to inspect the container by using the one flat lamp and the one camera.

14. The inspection method according to claim 8, wherein a foreign matter, a cracking, a chip, and/or a defect of a part in the container is detected by using the camera to inspect the portion to be inspected of the container.

15. The inspection method according to claim 8, wherein
a bar lamp is provided to face the flat lamp across the portion to be inspected of the container, and
the portion to be inspected of the container is irradiated with light from the bar lamp, in addition to the flat lamp.

* * * * *